United States Patent
Splaine et al.

(10) Patent No.: US 11,917,270 B2
(45) Date of Patent: *Feb. 27, 2024

(54) METHODS AND APPARATUS TO MONITOR MEDIA

(71) Applicant: The Nielsen Company (US), LLC, New York, NY (US)

(72) Inventors: Steven J. Splaine, Tampa, FL (US); Arun Ramaswamy, Tampa, FL (US); Kevin K. Gaynor, Sunnyvale, CA (US); Chris G. Nicotra, Holiday, FL (US); Alan N. Bosworth, Odessa, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/967,065

(22) Filed: Oct. 17, 2022

(65) Prior Publication Data

US 2023/0109728 A1   Apr. 13, 2023

Related U.S. Application Data

(63) Continuation of application No. 17/013,371, filed on Sep. 4, 2020, now Pat. No. 11,477,543, which is a
(Continued)

(51) Int. Cl.
*H04N 21/854* (2011.01)
*H04N 21/442* (2011.01)
(Continued)

(52) U.S. Cl.
CPC ......... *H04N 21/854* (2013.01); *H04H 60/31* (2013.01); *H04N 21/2405* (2013.01);
(Continued)

(58) Field of Classification Search
CPC ............ H04N 21/854; H04N 21/2405; H04N 21/44204; H04N 21/8352; H04N 21/8358; H04H 60/31; H04H 60/40
(Continued)

(56) References Cited

U.S. PATENT DOCUMENTS 6,650,644 B1   11/2003   Colley et al.
7,043,049 B2   5/2006   Kuzma
(Continued)

FOREIGN PATENT DOCUMENTS

KR   1020090079045 A   7/2009

OTHER PUBLICATIONS

United States Patent and Trademark Office, "Non-Final Office Action, " dated Mar. 7, 2018, in connection with U.S. Appl. No. 15/627,122, 16 pages.
(Continued)

*Primary Examiner* — Dominic D Saltarelli

(57) ABSTRACT

Methods, apparatus, systems, and articles of manufacture to monitor media are disclosed. An example apparatus includes first means for performing a first mapping of a first media identifier and timestamp to a second media identifier in a look-up table (LUT), the first media identifier and timestamp based on media obtained from a server, the first media identifier to identify the media, means for determining a third media identifier and a second timestamp based on media monitoring information (MMI) obtained from the server, the MMI obtained from the server in response to an access of the media identified by the third media identifier by a media device, second means for performing a second mapping of the third media identifier and the second timestamp to the first media identifier and timestamp in the LUT, and means for crediting access of the media to the media device based on the second mapping.

21 Claims, 8 Drawing Sheets

Related U.S. Application Data continuation of application No. 16/188,202, filed on Nov. 12, 2018, now Pat. No. 10,771,864, which is a continuation of application No. 15/627,122, filed on Jun. 19, 2017, now Pat. No. 10,129,610.

(60) Provisional application No. 62/398,498, filed on Sep. 22, 2016.

(51) Int. Cl.
    *H04N 21/835* (2011.01)
    *H04N 21/24* (2011.01)
    *H04H 60/31* (2008.01)
    *H04H 60/40* (2008.01)
    *H04N 21/8352* (2011.01)
    *H04N 21/8358* (2011.01)

(52) U.S. Cl.
    CPC ... *H04N 21/44204* (2013.01); *H04N 21/8352* (2013.01); *H04N 21/8358* (2013.01); *H04H 60/40* (2013.01)

(58) Field of Classification Search
    USPC .......................................................... 725/14
    See application file for complete search history.

(56) References Cited

U.S. PATENT DOCUMENTS

| | | | |
|---|---|---|---|
| 7,398,261 B2 | 7/2008 | Spivack et al. | |
| 7,987,369 B2 | 7/2011 | Zhang et al. | |
| 8,051,295 B2 | 11/2011 | Brunk et al. | |
| 8,130,811 B2 | 3/2012 | Tian et al. | |
| 8,161,064 B2 | 4/2012 | Ross | |
| 8,239,888 B2 | 8/2012 | Todd | |
| 8,566,857 B2 | 10/2013 | Putnam | |
| 9,288,057 B2 | 3/2016 | Jarnikov | |
| 9,313,294 B2 | 4/2016 | Perez et al. | |
| 9,756,094 B1 | 9/2017 | Lewis et al. | |
| 10,129,610 B2 | 11/2018 | Splaine et al. | |
| 10,672,035 B1 | 6/2020 | Holtan | |
| 10,771,864 B2 | 9/2020 | Splaine et al. | |
| 11,477,543 B2 | 10/2022 | Splaine et al. | |
| 2003/0120927 A1 | 6/2003 | Kim et al. | |
| 2008/0276265 A1 | 11/2008 | Topchy et al. | |
| 2010/0131969 A1 | 5/2010 | Tidwell et al. | |
| 2012/0102153 A1 | 4/2012 | Kemp et al. | |
| 2012/0265735 A1 | 10/2012 | McMillan et al. | |
| 2013/0291000 A1 | 10/2013 | Wright et al. | |
| 2014/0026158 A1 | 1/2014 | Rowe et al. | |
| 2014/0304061 A1 | 10/2014 | Bruich | |
| 2015/0007212 A1 | 1/2015 | Woods | |
| 2015/0281756 A1 | 10/2015 | Soon-Shiong et al. | |
| 2015/0339339 A1 | 11/2015 | Mastrodonato et al. | |
| 2016/0100018 A1* | 4/2016 | MacKenzie | G06F 16/4387 709/224 |
| 2018/0084313 A1 | 3/2018 | Splaine et al. | |
| 2018/0220169 A1* | 8/2018 | Yang | H04N 21/858 |
| 2019/0082237 A1 | 3/2019 | Splaine et al. | |
| 2020/0404397 A1 | 12/2020 | Splaine et al. | |

OTHER PUBLICATIONS

United States Patent and Trademark Office, "Notice of Allowance," dated Jul. 6, 2018, in connection with U.S. Appl. No. 15/627,122, 12 pages.

United States Patent and Trademark Office, "Non-Final Office Action, " dated Nov. 13, 2019, in connection with U.S. Appl. No. 16/188,202, 11 pages.

United States Patent and Trademark Office, "Final Office Action," dated Feb. 27, 2020, in connection with U.S. Appl. No. 16/188,202, 6 pages.

United States Patent and Trademark Office, "Notice of Allowance" dated May 5, 2020, in connection with U.S. Appl. No. 16/188,202, 7 pages.

United States Patent and Trademark Office, "Non-Final Office Action," dated Nov. 9, 2021, in connection with U.S. Appl. No. 17/013,371, 13 pages.

United States Patent and Trademark Office, "Final Office Action," dated Mar. 9, 2022, in connection with U.S. Appl. No. 17/013,371, 16 pages.

United States Patent and Trademark Office, "Advisory Action," dated May 20, 2022, in connection with U.S. Appl. No. 17/013,371, 2 pages.

United States Patent and Trademark Office, "Notice of Allowance and Fee(s) Due," dated Jun. 16, 2022, in connection with U.S. Appl. No. 17/013,371, 7 pages.

* cited by examiner ns to Monitor
METHODS AND APPARATUS TO MONITOR MEDIA

RELATED APPLICATION

This patent arises from a continuation of U.S. patent application Ser. No. 17/013,371, (now U.S. Pat. No. 11,477,543) which was filed on Sep. 4, 2020, which is a continuation of U.S. patent application Ser. No. 16/188,202, (now U.S. Pat. No. 10,771,864) which was filed on Nov. 12, 2018, which is a continuation of U.S. patent application Ser. No. 15/627,122, (now U.S. Pat. No. 10,129,610) which was filed on Jun. 19, 2017, which claims the benefit of U.S. Provisional Patent Application No. 62/398,498, which was filed on Sep. 22, 2016. U.S. patent application Ser. No. 17/013,371; U.S. patent application Ser. No. 16/188,202; U.S. patent application Ser. No. 15/627,122; and U.S. Provisional Patent Application No. 62/398,498 are hereby incorporated by reference in their entireties. Priority to U.S. patent application Ser. No. 17/013,371; U.S. patent application Ser. No. 16/188,202; U.S. patent application Ser. No. 15/627,122; and U.S. Provisional Patent Application No. 62/398,498 is hereby claimed.

FIELD OF THE DISCLOSURE

This disclosure relates generally to monitoring media and, more particularly, to methods and apparatus to monitor media.

BACKGROUND

In recent years, methods of accessing media have evolved. For example, in the past, media was primarily accessed via televisions coupled to set-top boxes. Recently, media services deployed via computer systems such as desktop, laptop, and handheld mobile devices (e.g., smartphones, tablets, etc.) have been introduced that allow users to request and present the media on the computer systems. Such computer systems as well as other media presentation platforms enable consumption of the media from a variety of content providers and content publishers.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
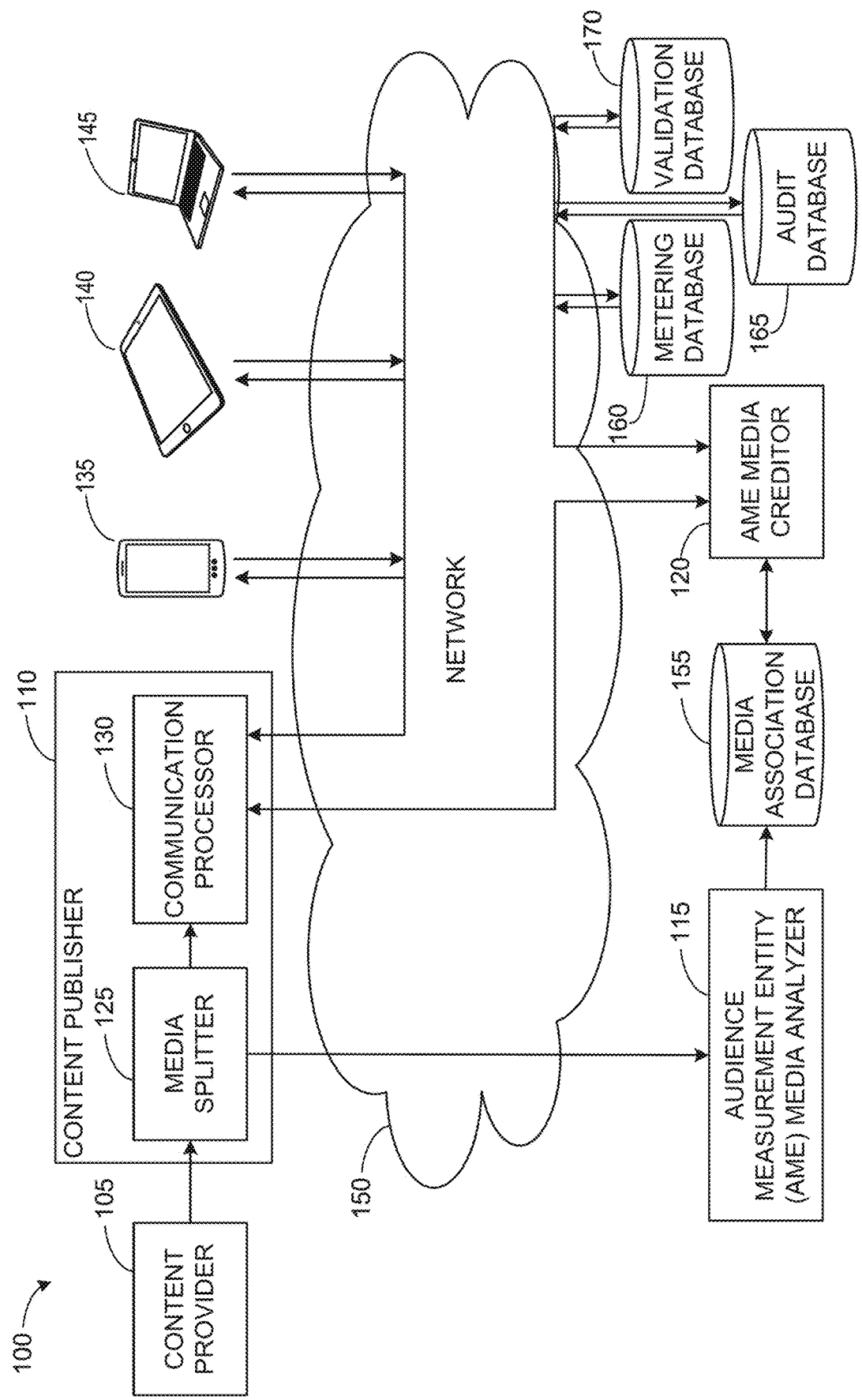
FIG. 1 is a block diagram of an example environment in which an example audience measurement entity (AME) media analyzer and an example AME media creditor monitor media.

Many entities have an interest in understanding how users are exposed to media on the Internet. For example, AMEs desire knowledge on how users interact with media devices such as smartphones, tablets, laptops, smart televisions, etc. In particular, an example AME may want to monitor media presentations made at the media devices to, among other things, monitor exposure to advertisements, determine advertisement effectiveness, determine user behavior, identify purchasing behavior associated with various demographics, etc.

AMEs coordinate with advertisers to obtain knowledge regarding an audience of media. For example, advertisers are interested in knowing the composition, engagement, size, etc. of an audience for media. For example, media (e.g., audio and/or video media) may be distributed by a media distributor to media consumers. Content distributors, advertisers, content producers, etc. have an interest in knowing the size of an audience for media from the media distributor, the extent to which an audience consumes the media, whether the audience pauses, rewinds, fast forwards the media, etc. As used herein the term "content" includes programs, advertisements, clips, shows, etc. As used herein, the term "media" includes any type of content and/or advertisement delivered via any type of distribution medium. Thus, media includes television programming or advertisements, radio programming or advertisements, movies, web sites, streaming media, etc.

In some instances, AMEs identify media by extracting media identifiers such as signatures or media-identifying metadata such as codes, watermarks, etc. and comparing them to reference media identifiers. For example, audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information. Example techniques to perform audio watermarking detection and extraction are disclosed in U.S. Pat. No. 8,369,972, filed on Oct. 10, 2008, entitled "Methods and Apparatus to Perform Audio Watermarking and Watermark Detection and Extraction," which is hereby incorporated herein by reference in its entirety.

In some examples, AMEs measure online video playing, advertisements, page views, etc. via a digital content rating (DCR) implementation. For example, instead of using signatures or watermarks (i.e., in-band metadata), AMEs may generate media exposure metrics using out-of-band metadata extracted from a metadata file associated with an Electronic Program Guide (EPG) (e.g., a digital television live channel lineup guide, a human-readable video on-demand (VoD) catalog, etc.). The AMEs may tag media content with instructions. For example, a media device that accesses the tagged media may execute the instructions to send media monitoring information (MMI) to a demographic provider (e.g., Facebook®). The demographic provider may generate monitoring statistics corresponding to the MMI for a plurality of media devices and demographic information associated with users of the media devices. The demographic provider may transmit the monitoring statistics to the AMEs to credit media.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, MMI including media identifiers is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information.

In examples disclosed herein, MMI includes, but is not limited to, media identifiers (e.g., media-identifying metadata, codes, signatures, watermarks, and/or other information that may be used to identify presented media), application usage information (e.g., an identifier of an application, a time and/or duration of use of the application, a rating of the application, etc.), user-identifying information (e.g., demographic information, a user identifier, a device identifier, a username, etc.), timestamp information (e.g., a time at which media was accessed, a time corresponding to a media segment within media, etc.), and/or content publisher identifiers (e.g., publisher asset identifiers). As used herein, a publisher asset identifier includes a content identifier that is proprietary to a publisher (e.g., a content publisher) and/or a timestamp from the publisher assigned to a portion or a segment of media. In some examples, the publisher asset identifier is a media identifier when the publisher asset identifier is used to identify media. For example, a content publisher may generate a publisher asset identifier to correspond to a particular portion or a segment of media. For example, the publisher asset identifier may be used to identify a media source (e.g., Netflix®, YouTube®, Hulu®, Pandora®, Last.fm®, etc.), a media type (e.g., an episode of a television show, a movie, a song, streaming content, etc.), etc.

In some examples, AMEs coordinate with content providers and/or content publishers to monitor media presentations at media devices. For example, a content publisher may embed functionality (e.g., media monitoring functionality) into an application that is downloaded and/or utilized by a media device. The content publisher may embed the functionality via a client-side software development kit (SDK), a Cloud Application Program Interface (API), etc. For example, the content publisher may add functionality instructing the media device to log, store, and/or transmit MMI. However, content publishers may be hesitant to implement the functionality within their applications due to increased technological costs such as, for example, additional programming, testing (e.g., managing different version upgrades, coordinating with multiple external developers, etc.), and maintenance. Content publishers may also be hesitant due to effects of external code bloat (e.g., code developed by an entity external to a content publisher, etc.) that may lead to as increased application size, slower execution speeds, and security vulnerabilities.

In some disclosed examples, an AME implements a multi-server approach to obtain MMI. The AME may obtain a media feed (e.g., a live video feed, an on-demand video feed, etc.) from a content publisher (e.g., via a stream splitter at the content publisher). The AME analyzes the media feed to identify the media by extracting metadata (e.g., a watermark) embedded in the audio, video, etc. of the media. The AME also analyzes the media feed to extract a publisher asset identifier. The AME may create an association of a publisher asset identifier of the content publisher with the metadata. The AME may store the association, the extracted metadata, the publisher asset identifier, etc. in a database such as, for example, a look-up table.

In some disclosed examples, the AME obtains MMI from a media device via a content publisher. For example, the content publisher may package audio and/or video quality monitoring software instructions such as content publisher analytics software, AME analytics software, quality of service (QoS) software, etc. within an application (e.g., a video player) distributed by the content publisher. When the media device downloads the application, the media device may routinely, or by request, transmit analytics information (e.g., QoS data) to the content publisher. Analytics information may include parameters such as, for example, an availability, a bit rate, an error rate, jitter (e.g., jitter frequency, jitter period, etc.), transmission delay, data throughput, etc. In some instances, the media device transmits MMI to the content publisher. The content publisher may transmit the MMI obtained from the media device to the AME. For example, the content publisher may relay or re-transmit analytics information, MMI, etc. corresponding to media presented at the media device to the AME.

In some disclosed examples, the AME maps MMI obtained from a content publisher to reference MMI stored in a database. For example, the AME may extract a publisher asset identifier, a publisher timestamp, etc. from the analytics information. The AME may identify the media presented at the media device based on the publisher asset identifier, the publisher timestamp, etc. For example, the AME may identify the media based on mapping the publisher asset identifier and/or the publisher timestamp to an AME identifier and/or an AME timestamp. The AME may generate a report (e.g., a media exposure report) based on an identification of the media at the media device.

In some disclosed examples, AMEs ignore or filter MMI from users or media devices that opt-out of monitoring processes (e.g., multi-server media monitoring processes). For example, a user may use a media device such as a laptop, a mobile device, a tablet, etc. to navigate to an AME privacy web page, where the user may elect to opt-out of monitoring processes. In response to the AME receiving an opt-out request, the AME may transmit an opt-out cookie to a browser or an application on the media device. When the media device subsequently accesses media, a content publisher may query the AME to determine whether the media device has opted-out. In response to the AME determining that the media device has opted-out, the AME may flag the media device as an opt-out. When the AME obtains MMI from the content publisher corresponding to the opted-out media device, the AME may ignore, filter, delete, fail to report, etc. the MMI corresponding to the opted-out media device.

FIG. 1 is a block diagram of an example environment 100 constructed in accordance with the teachings of this disclosure to identify media presented at a media device. The example environment 100 includes an example content provider 105, an example content publisher 110, an example audience measurement entity (AME) media analyzer 115, and an example AME media creditor 120. The example content publisher 110 includes an example media splitter 125 and an example communication processor 130. The example communication processor 130 is communicatively coupled to example media devices 135, 140, 145 via an example network 150. Further shown are an example media association database 155, an example metering database 160, an example audit database 165, and an example validation database 170.

In the illustrated example of FIG. 1, the content provider 105 is a media generator. For example, the content provider 105 may be an audio (e.g., audio-book, Internet radio, music, podcast, etc.) creator, a video (e.g., a movie, a television show, YouTube® video, etc.) generator, and/or a combination thereof. The example content provider 105 may transmit media to the example content publisher 110 for distribution to media consumers.

In the illustrated example of FIG. 1, the content publisher 110 is a server providing Internet media (e.g., web pages, audio, videos, images, embedded media, etc.). The content publisher 110 may be implemented by any provider(s) of media such as a digital broadcast provider (cable television service, fiber-optic television service, etc.) and/or an on-demand digital media provider (e.g., Internet streaming video and/or audio services such as Netflix®, YouTube®, Hulu®, Pandora®, Last.fm®,) and/or any other provider of streaming media services. In some other examples, the content publisher 110 is a host for web site(s). The media provided by the example content publisher 110 can provide any type(s) of media, such as audio, video, multimedia, etc. Additionally, the media can correspond to live media, streaming media, broadcast media, stored media, on-demand content, etc.

The content publisher 110 of the illustrated example of FIG. 1 provides media services to the media devices 135, 140, 145 via, for example, web pages including links (e.g., hyperlinks, embedded media, etc.) to media provided by the content provider 105. In the illustrated example, the content publisher 110 modifies the media provided by the content provider 105 prior to transmitting the media to the media devices 135, 140, 145. For example, the content publisher 110 may modify the media by changing an aspect ratio of the media to be presented on different device form factors (e.g., a smartphone, a tablet, a television, etc.), a video resolution and/or video quality based on available download bandwidth, etc. In another example, the content publisher 110 may modify the media by embedding a media identifier such as a publisher asset identifier, a publisher timestamp, etc. in the media.

In the illustrated example of FIG. 1, the content publisher 110 includes the example media splitter 125 and the communication processor 130. While the illustrated example of FIG. 1 discloses an example implementation of the content publisher 110, other example implementations of the content publisher 110 may additionally or alternatively be used. The example content publisher 110 includes the example media splitter 125 to split a path of a media feed obtained from a media source. For example, the media splitter 125 may obtain a media feed from the example content provider 105 and transmit the media feed (e.g., transmit a copy of the media feed) to two or more destinations or media paths, where each media path receives the same media feed. In the illustrated example, the media splitter 125 transmits the media feed to (1) the communication processor 130, and (2) the AME media analyzer 115 via the network 150.

In the illustrated example of FIG. 1, the content publisher 110 includes the communication processor 130 to publish the media feed (e.g., making the media available for download, streaming, etc. for the media devices 135, 140, 145). The example communication processor 130 may publish the media feed in parallel with the example AME media analyzer 115 processing the media feed (e.g., generating a look-up table). Alternatively, the example communication processor 130 may publish the media feed before or after the example AME media analyzer 115 processes the media feed.

The communication processor 130 of the illustrated example of FIG. 1 interfaces with the AME media creditor 120 and the media devices 135, 140, 145 via the network 150. For example, the communication processor 130 may obtain MMI corresponding to a presentation of media at the media devices 135, 140, 145. In some examples, the MMI includes information indicating that the media devices 135, 140, 145 accessed (e.g., downloaded, listened, viewed, etc.) the media. In some instances, the MMI includes analytics information such as Quality of Service (QoS) information transmitted periodically by the media devices 135, 140, 145 when the media devices 135, 140, 145 access the media. In some examples, the MMI includes media interaction information such as a user agent string in a HTTP message to identify the user device on which the media is requested, a media identifier such as a publisher asset identifier to identify the media, a host identifier to identify the host (e.g., web server) with which the requested media is associated (e.g., a vendor identifier (VID)), a timestamp to identify the dates/times at which the media is requested, accessed and/or received, one or more command identifiers identifying control commands (e.g., pause, play, stop, etc.) acted upon the media, etc.

In the illustrated example of FIG. 1, the AME media analyzer 115 obtains a media feed from the media splitter 125. The example AME media analyzer 115 analyzes the media feed to identify media included in the media feed. For example, the AME media analyzer 115 may identify the media by extracting an AME identifier (e.g., a media identifier) such as a watermark embedded in the audio of the media. In another example, the AME media analyzer 115 may identify the media by determining an AME identifier by accessing descriptive metadata of the media such as an AME timestamp. In another example, the AME media analyzer 115 may identify the media by comparing media information (e.g., embedded metadata, watermarks, etc.) to electronic program data (e.g., data from an electronic program guide), program schedule information, etc.

In some examples, the AME media analyzer 115 obtains reference data from the content publisher 110 that publishes the media. For example, the AME media analyzer 115 may obtain a first identifier corresponding to the media from the content publisher 110 such as a signature, a watermark, or any other type of media-identifying metadata. The example AME media analyzer 115 may validate the first identifier by comparing the first identifier to a second identifier extracted from the media presented at a reference site (e.g., an AME identifier). In some examples, the AME media analyzer 115 validates the reference data from the content publisher 110 when the first and the second identifiers match. In some instances, the AME media analyzer 115 does not validate the reference data when the first and the second identifiers do not match and, thus, the reference data is not to be used for crediting the media.

In yet another example, the AME media analyzer 115 may identify the media by identifying a signature. For example, the AME media analyzer 115 may analyze a characteristic of the media (e.g., the audio and/or the video component of the media) and compare the characteristic against reference characteristics. As used herein, the AME identifier is an identifier assigned to media or a segment of the media by an AME, where the identifier identifies a source of the media based on an extracted code or watermark of the media, by comparing an extracted signature of the media to a reference signature, etc.

The example AME media analyzer 115 extracts a publisher asset identifier from the media feed obtained from the media splitter 125. For example, the AME media analyzer 115 may extract a publisher asset identifier when extracting the AME identifier, the AME timestamp, etc. from the media. In response to extracting a publisher asset identifier, the example AME media analyzer 115 creates an association of (1) a publisher asset identifier of a publisher of the media (e.g., an identifier transmitted by the example content provider 105 with the media), (2) the AME identifier, and/or (3) the AME timestamp corresponding to the AME identifier, where the AME timestamp corresponds to a portion or a segment of the media as identified by the AME media analyzer 115. For example, the AME media analyzer 115 may generate a look-up table based on the association, and store the look-up table in the media association database 155.

In some examples, the AME media analyzer 115 identifies the media in the media feed by comparing metadata (e.g., content management system (CMS) metadata, electronic program guide (EPG) metadata, etc.) embedded in the media to baseline metadata. The baseline metadata may be obtained from a look-up table, a mainstream EPG, etc. The example AME media analyzer 115 may identify the media when the embedded metadata matches the baseline metadata.

In the illustrated example of FIG. 1, the AME media creditor 120 obtains MMI (e.g., analytics information) from the content publisher 110 via the network 150, where the MMI corresponds to media presented at the media devices 135, 140, 145. The MMI may include information such as, for example, publisher asset identifiers, return path data, streams received information, etc. The MMI obtained from the example content publisher 110 is unlikely to include the AME identifier and/or the AME timestamp.

In some examples, the AME media creditor 120 maps the publisher asset identifier, the publisher timestamp (e.g., a timestamp of a segment of the media as identified by the content publisher 110), etc. to the corresponding AME identifier and/or the AME timestamp to identify the media. In some instances, the AME media creditor 120 performs quality control validation by comparing the MMI from the content publisher 110 to audience measurement data obtained from the metering database 160, the audit database 165, the validation database 170, etc. As used herein, the term "audience measurement data" refers to data collected by an audience measurement entity based on metering techniques (e.g., metering data), audit techniques (e.g., audit data), etc. For example, the content publisher 110 may not send accurate MMI to the AME media creditor 120. As a result, the example AME media creditor 120 may obtain metering data, audit data, etc. from the example metering database 160, the example audit database 165, the example validation database 170, etc. to analyze to identify erroneous data, outliers, etc. For example, the AME media creditor 120 may collect and/or aggregate data from the metering database 160 to determine statistics associated with metering data. In some instances, the AME media creditor 120 generates a report based on identifying the media and transmits the report to the audit database 165, the validation database 170, reporting servers, census data aggregation servers, operation analyzers, etc.

In the illustrated example of FIG. 1, the media devices 135, 140, 145 are devices that present media retrieved from the content publisher 110. In some examples, the media devices 135, 140, 145 are capable of directly presenting media (e.g., via a display) while, in some other examples, the media devices present the media on separate media presentation equipment (e.g., speakers, a display, etc.). For example, the media device 135 of the illustrated example is an Internet-enabled mobile handset (e.g., a smartphone), and thus, is capable of presenting media (e.g., via an integrated display and speakers). The media device 140 of the illustrated example is an Internet-enabled tablet (e.g., an iPad, a Surface, etc.) capable of presenting media (e.g., via an integrated display and speakers). The media device 145 of the illustrated example is an Internet-enabled laptop computer capable of presenting media (e.g., via an integrated display and speakers).

While, in the illustrated example, an Internet-enabled mobile handset, an Internet-enabled tablet, and an Internet-enabled laptop are shown, any other type(s) and/or number(s) of media presentation device(s) may additionally or alternatively be used. For example, digital media players (e.g., a Roku® media player, a Slingbox®, etc.,), gaming consoles, Internet-enabled televisions, etc. may additionally or alternatively be used. Further, while in the illustrated example three media devices are shown, any number of media devices may be used.

In the illustrated example of FIG. 1, the network 150 is the Internet. However, the example network 150 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 150 enables the content publisher 110 to be in communication with the AME media analyzer 115, the example AME media creditor 120, and the example media devices 135, 140, 145. As used herein, the phrase "in communication," including variances (e.g., secure or non-secure communications, compressed or non-compressed communications, etc.) therefore, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 1, the environment 100 includes the media association database 155, the metering database 160, the audit database 165, and the validation database 170 to record and transmit data (e.g., associations, MMI, metering data, audit data, timestamps, etc.). The media association database 155, the metering database 160, the audit database 165, and the validation database 170 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The media association database 155, the metering database 160, the audit database 165, and the validation database 170 may additionally or alternatively be implemented by one or more double data rate (DDR) memories, such as DDR, DDR2, DDR3, DDR4, mobile DDR (mDDR), etc. The media association database 155, the metering database 160, the audit database 165, and the validation database 170 may additionally or alternatively be implemented by one or more mass storage devices such as hard disk drive(s), solid-state drives, flash memory drives, compact disk drive(s) digital versatile disk drive(s), etc. While in the illustrated example the media association database 155, the metering database 160, the audit database 165, and the validation database 170 are illustrated as single databases, the media association database 155, the metering database 160, the audit database 165, and the validation database 170 may be implemented by any number and/or type(s) of databases. Furthermore, the data stored in the media association database 155, the metering database 160, the audit database 165, and the validation database 170 may be in any data format such as, for example, binary data, comma delimited data, tab delimited data, structured query language (SQL) structures, etc.

In the illustrated example of FIG. 1, the metering database 160 is a server that collects and processes metering data. As used herein, the term "metering data" refers to panelist data obtained from media devices associated with panelists monitored by a meter (e.g., a people meter, a media meter, etc.), where the media devices are accessing media. In some examples, the metering database 160 obtains audience measurement data such as metering data from a metering device in a media exposure measurement location (e.g., a panelist household, an Internet café, an office, an airport, a library, a non-panelist household, etc.). As used herein, the term "panelists" refers to users registered on panels maintained by a ratings entity (e.g., an audience measurement entity) that owns and/or operates the ratings entity subsystem.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

People become panelists via, for example, a user interface presented on a media device (e.g., via a website). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

In the illustrated example of FIG. 1, the audit database 165 is a server that collects and processes audit data. As used herein, the term "audit data" refers to data such as MMI obtained from media devices associated with panelists monitored by automated processes such as monitoring scripts, where the media devices are accessing media. For example, a panelist media device may execute a monitoring script when accessing media to transmit audit information to the audit database 165. In some examples, the monitoring script operates on the media devices 135, 140, 145 and automatically transmits MMI to the content publisher 110. Alternatively, users of the example media devices 135, 140, 145 may manually execute the monitoring script to transmit MMI to the example content publisher 110. Audit information may include a media presentation session start indicator (e.g., a start indicator of a user session), a media presentation session end indicator (e.g., an end indicator of a user session), a media presentation start indicator (e.g., a start indicator of an individual video stream, an individual audio stream, etc.), a media presentation end indicator (e.g., an end indicator of an individual video stream, an individual audio stream, etc.), an Internet Protocol (IP) address, a media access control (MAC) address, an audio watermark of the media, a signature of the media, etc. A media presentation session start and end indicator refer to a timestamp when media presentation starts and ends respectively. Alternatively, the audit information may not include an IP address, a MAC address, etc.

In some examples, the audit database 165 calculates a duration of media presentation by determining a difference between media presentation session start and end pings. In some instances, the audit database 165 stores and transmits census data. As used herein, the term "census data" refers to data such as MMI corresponding to non-panelists. For example, the audit database 165 may obtain census data via audit pings and/or audit communication between a media device and the audit database 165. The audit pings may be transmitted periodically, upon executing an automated monitoring script at the media device, upon request by the audit database 165 or the AME, upon a user manually executing the monitoring script, etc.

In the illustrated example of FIG. 1, the validation database 170 is a server that collects and processes validation data obtained from the AME media creditor 120, the metering database 160, the audit database 165, etc. For example, the validation database 170 may obtain validation alerts from the AME media creditor 120, where a validation alert includes an alert not to report obtained MMI. The example validation database 170 may include trending information or alerts. For example, the validation database 170 may include information corresponding to suggested media presentation for a media consumer based on the AME media creditor 120 identifying media presented at the media devices 135, 140, 145, etc.

Figure 2:
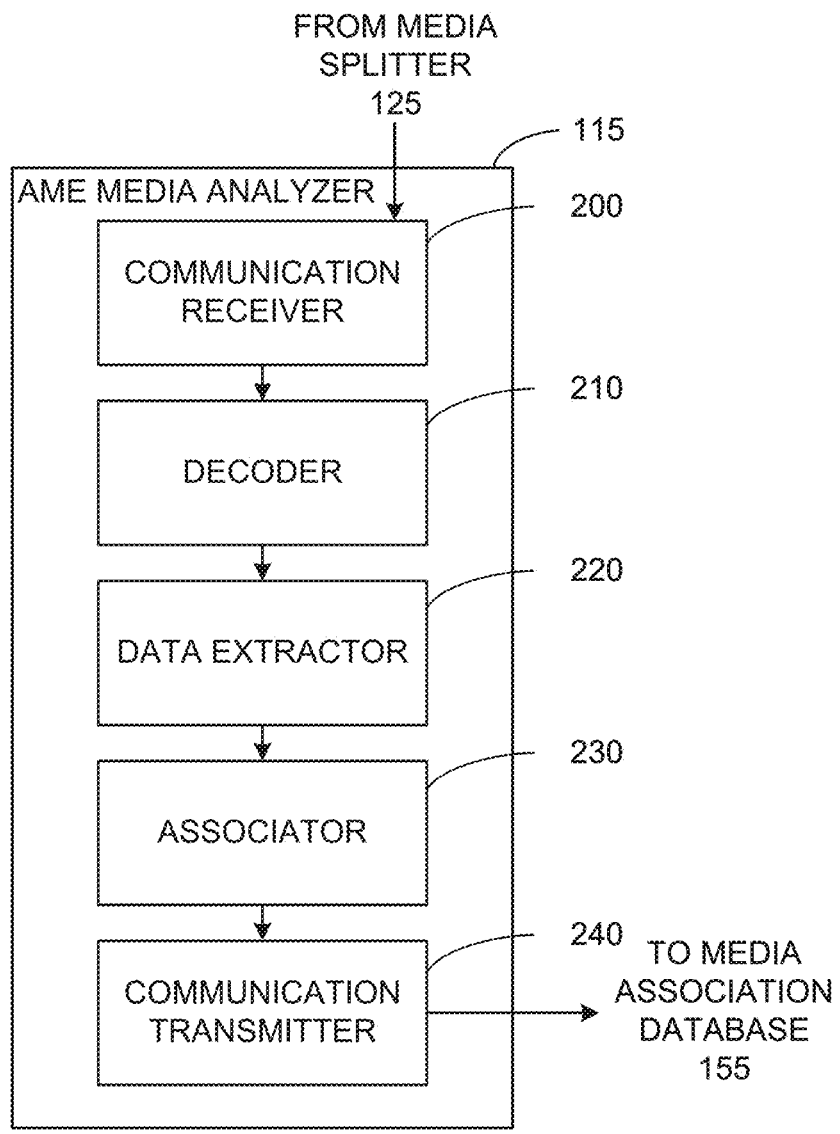
FIG. 2 is a block diagram of an example implementation of the AME media analyzer of FIG. 1.

FIG. 2 is a block diagram of an example implementation of the example AME media analyzer 115 of FIG. 1. The example AME media analyzer 115 associates information (e.g., media identifiers) corresponding to the example content publisher 110 with an AME identifier (e.g., a watermark) and an AME timestamp. The example AME media analyzer 115 includes an example communication receiver 200, an example decoder 210, an example data extractor 220, an example associator 230, and an example communication transmitter 240.

In the illustrated example of FIG. 2, the AME media analyzer 115 includes the communication receiver 200 to obtain Internet communication. In the illustrated example, the communication receiver 200 implements a web server to obtain a media feed from the media splitter 125 of FIG. 1 via the network 150. For example, the media feed can be pushed to the AME media analyzer 115 from the content publisher 110. In another example, the media feed can be pulled from the content publisher 110 by the AME media analyzer 115. The media feed may be formatted as an HTTP message.

However, any other message format and/or protocol may additionally or alternatively be used such as, for example, a file transfer protocol (FTP), a real-time transport protocol (RTP), a real-time control protocol (RTCP), a simple message transfer protocol (SMTP), an HTTP secure (HTTPS) protocol, an HTTP Live Streaming (HLS) protocol, a continuous stream from the example content publisher 110, etc. Alternatively, the media feed may be playback from a standalone file obtained from the example content publisher 110. In some examples, the communication receiver 200 unpacks data from the Internet communication (e.g., extracts data payload from an HTTP message) to be analyzed by the AME media analyzer 115.

In the illustrated example of FIG. 2, the AME media analyzer 115 includes the decoder 210 to decode metadata embedded in media. In some examples, the media splitter 125 of FIG. 1 transmits non-decoded media (e.g., unprocessed audio, unprocessed video, etc.) to the AME media analyzer 115. For example, the media splitter 125 may transmit media that includes embedded (i.e., coded, encrypted, etc.) metadata. Alternatively, the example media splitter 125 may transmit decoded media (e.g., media with decoded metadata).

In some examples, the decoder 210 analyzes the media and determines that the media requires decoding. For example, the decoder 210 may select a media segment of the media. The example decoder 210 may detect a presence of embedded metadata in the media segment such as a code, a watermark, etc. In response to detecting the presence of the embedded metadata, the example decoder 210 may decode the embedded metadata. Additionally or alternatively, the example decoder 210 may extract a signature from the media segment (e.g., one or more characteristics of an audio and/or a video component of the media segment). In response to extracting the signature, the example decoder 210 may compare the signature to a reference signature (e.g., a signature extracted from the media presented at a reference site, a signature obtained from the example content publisher 110, etc.) to identify the media segment. In some examples, the decoder 210 determines whether there is another media segment to process. For example, the decoder 210 may determine that the decoder 210 reached the end of the media, the media feed has been discontinued, etc. In some instances, the decoder 210 decodes an AME timestamp corresponding to the embedded metadata. For example, the AME timestamp may correspond to a media segment of the media as identified by the decoder 210.

In the illustrated example of FIG. 2, the AME media analyzer 115 includes the data extractor 220 to extract information from media. For example, the data extractor 220 may extract decoded metadata (e.g., an AME identifier), publisher asset identifiers, timestamp information (e.g., an AME timestamp), etc. from the media. In some examples, the data extractor 220 may obtain information from an Internet communication packet. For example, the data extractor 220 may determine a source of the media by extracting a uniform resource locator (URL) from the Internet communication packet.

In the illustrated example of FIG. 2, the AME media analyzer 115 includes the associator 230 to generate one or more associations of MMI with an AME identifier. The example associator 230 may generate a look-up table entry based on the one or more associations. In some examples, the associator 230 generates a look-up table based on one or more look-up table entries. For example, the associator 230 may generate a look-up table entry that associates (1) a publisher asset identifier of media, (2) an AME identifier determined from metadata embedded in the media (e.g., a source identifier and a timestamp included in an embedded watermark), and (3) an AME timestamp corresponding to a media segment (e.g., a timestamp that increments from a start of the media, a timestamp that corresponds to a media segment within the media, etc.). In some examples, the identification information (e.g., the AME identifier) may include a universal identifier that is the same across multiple media distribution platforms and, thus, using the universal identifier and a corresponding timestamp may aid in linking MMI collected on a variety of platforms (e.g., a variety of content publishers).

In the illustrated example of FIG. 2, the AME media analyzer 115 includes the communication transmitter 240 to transmit information to the media association database 155 of FIG. 1. In the illustrated example, the example communication transmitter 240 implements a web server that transmits information such as, for example, media identifiers, a look-up table (e.g., an association look-up table), MMI, timestamps corresponding to a portion or a segment of media, etc. In the illustrated example, the transmitted information is formatted as an HTTP message. However, any other message format and/or protocol may additionally or alternatively be used such as, for example, a file transfer protocol (FTP), a simple message transfer protocol (SMTP), an HTTP secure (HTTPS) protocol, etc. Additionally or alternatively, the example communication transmitter 240 may transmit data via any other communication medium. For example, the communication transmitter 240 might transmit data via, for example, a USB connection, a Bluetooth connection, a serial connection, a local area network (LAN), etc.

In some examples, the communication transmitter 240 periodically and/or a-periodically transmits data to the media association database 155 of FIG. 1. The example communication transmitter 240 may transmit the data upon determining that the amount of data processed by the AME media analyzer 115 but not yet transmitted to the example media association database 155 has reached a threshold, and/or in response to a timer reaching a threshold (e.g., a time limit specifying that network communications are transmitted once every day). However, the transmission may occur at any desired interval(s) such as, for example, transmitting once every hour, once every week, etc. In examples in which the transmission is triggered based on an amount of data processed, but not yet transmitted, by the AME media analyzer 115, the transmission threshold might indicate that data should be transmitted if there is more than a predetermined amount (e.g., one megabyte) of data processed, but not yet transmitted, by the AME media analyzer 115. Any data processed amount may be used for such a trigger such as, for example, ten megabytes, one hundred megabytes, etc. Additionally or alternatively, multiple transmission thresholds may be present. For example, a first threshold indicating that data should be transmitted at least once a day and a second threshold indicating that data should be transmitted if more than one megabyte of data is processed, but not yet transmitted to the media association database 155 might be used.

While an example manner of implementing the AME media analyzer 115 of FIG. 1 is illustrated in FIG. 2, one or more of the elements, processes and/or devices illustrated in FIG. 2 may be combined, divided, re-arranged, omitted, eliminated, and/or implemented in any other way. Further, the example communication receiver 200, the example decoder 210, the example data extractor 220, the example associator 230, the example communication transmitter 240 and/or, more generally, the example AME media analyzer 115 of FIG. 2 may be implemented by hardware, software, firmware, and/or any combination of hardware, software, and/or firmware. Thus, for example, any of the example communication receiver 200, the example decoder 210, the example data extractor 220, the example associator 230, the example communication transmitter 240 and/or, more generally, the example AME media analyzer 115 of FIG. 2 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example communication receiver 200, the example decoder 210, the example data extractor 220, the example associator 230, the example communication transmitter 240 and/or, more generally, the example AME media analyzer 115 of FIG. 2 is/are hereby expressly defined to include a non-transitory computer readable storage device or storage disk such as a memory, a digital versatile disk (DVD), a compact disk (CD), a Blu-ray disk, etc. storing the software and/or firmware. Further still, the example AME media analyzer 115 of FIG. 2 may include one or more elements, processes, and/or devices in addition to, or instead of, those illustrated in FIG. 2, and/or may include more than one of any or all of the illustrated elements, processes, and devices.

Figure 3:
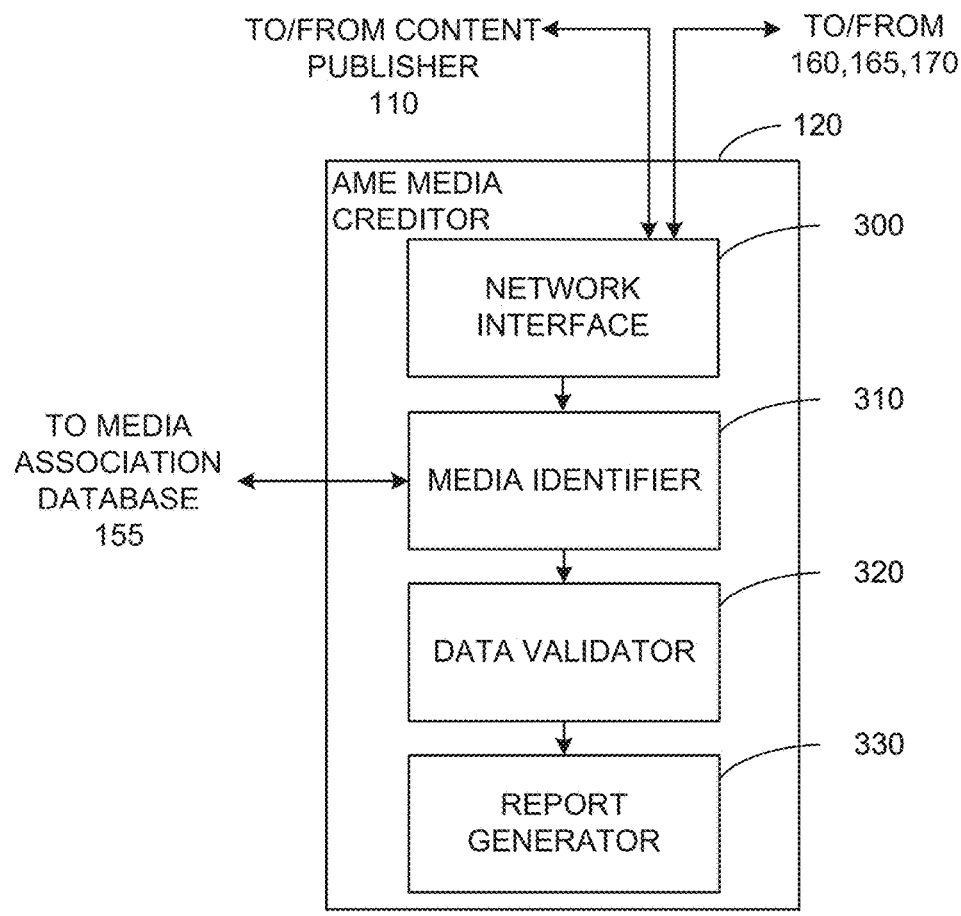
FIG. 3 is a block diagram of an example implementation of the AME media creditor of FIG. 1.

FIG. 3 is a block diagram of an example implementation of the example AME media creditor 120 of FIG. 1. The example AME media creditor 120 credits and/or identifies media presented at a media device. The example AME media creditor 120 includes an example network interface 300, an example media identifier 310, an example data validator 320, and an example report generator 330.

In the illustrated example of FIG. 3, the AME media creditor 120 includes the network interface 300 to obtain information from and/or transmit information to the network 150 of FIG. 1. In the illustrated example, the example network interface 300 implements a web server that receives MMI from the content publisher 110, audience measurement data from the metering database 160, the audit database 165, the validation database 170, etc. In the illustrated example, the monitoring information is formatted as an HTTP message. However, any other message format and/or protocol may additionally or alternatively be used such as, for example, a file transfer protocol (FTP), a real-time transfer protocol (RTP), a simple message transfer protocol (SMTP), an HTTP secure (HTTPS) protocol, etc.

In the illustrated example of FIG. 3, the AME media creditor 120 includes the media identifier 310 to identify media accessed by or presented at the media devices 135, 140, 145. In some examples, the media identifier 310 determines a publisher asset identifier and/or a publisher timestamp from obtained MMI (e.g., MMI received from the example content publisher 110). The example media identifier 310 may map the publisher asset identifier and/or the publisher timestamp to an AME identifier and/or an AME timestamp in a look-up table. For example, the media identifier 310 may query a look-up table in the media association database 155. The example media identifier 310 may reference the look-up table to identify media corresponding to the obtained MMI.

In some examples, the media identifier 310 credits a media device based on identifying a media segment. For example, the media identifier 310 may credit the media devices 135, 140, 145 to having been presented the media segment based on mapping a publisher asset identifier and/or a publisher timestamp to an AME identifier and/or an AME timestamp. In some instances, the media identifier 310 credits the media segment for being presented to the media device. For example, the media identifier 310 may credit the media segment to having been presented to the media devices 135, 140, 145 based on mapping the publisher asset identifier and/or the publisher timestamp to the AME identifier and/or the AME timestamp.

In the illustrated example of FIG. 3, the AME media creditor 120 includes the data validator 320 to perform quality control on obtained and/or processed information (e.g., MMI). In some examples, the content publisher 110 does not send accurate MMI (e.g., either by accident or by intention) to the AME media creditor 120. In some instances, the data validator 320 performs verifications to ensure that the content publisher 110 is sending accurate data. For example, the data validator 320 may access a media segment independently of receiving MMI corresponding to the media segment from the content publisher 110. For example, the data validator 320 may inspect the MMI from the content publisher 110 corresponding to a media segment. The example data validator 320 may identify a source of the media segment by identifying a URL of the media segment. The example data validator 320 may obtain the URL by inspecting the MMI, by inspecting the network communication (e.g., a header of an HTTP request) that delivered the MMI, etc.

In some examples, the data validator 320 transmits a request directed to a URL to retrieve a media segment. The example data validator 320 may obtain and analyze the requested media segment and extract MMI from the requested media segment. For example, the data validator 320 may utilize a user identifier (e.g., an identifier for advertisers (IDFA)) when accessing the requested media segment so that the access to the requested media segment can be determined by locating the IDFA in the MMI sent by the content publisher 110 to the AME media creditor 120. The example data validator 320 may compare (1) the extracted MMI from the retrieved media to (2) the obtained MMI from the content publisher 110. The example data validator 320 may determine whether there are any differences between the extracted and the obtained MMI. In response to determining a difference, the example data validator 320 may determine that the MMI obtained from example content publisher 110 is not to be used for reporting. For example, the data validator 320 may generate and transmit a validation alert to the validation database 170.

In some examples, the data validator 320 performs quality control validation of MMI by obtaining audit information from the media devices 135, 140, 145 of FIG. 1 via the audit database 165 of FIG. 1 that does not include the same amount, depth, type, etc. of information compared to the MMI obtained from the content publisher 110. In some instances, the quality control information obtained from the media devices 135, 140, 145 via the audit database 165 is limited to one or fewer than the total number of parameters included in the MMI obtained from the content publisher 110. The example data validator 320 may compare a parameter included in the quality control information to the same parameter included in the MMI to determine whether the remaining parameters included in the MMI have a higher probability of being correct.

For example, the data validator 320 may perform quality control validation of MMI based on calculating media presentation session duration by comparing media presentation session start and end indicators, media presentation start and end indicators, etc. For example, the data validator 320 may extract (1) a first media presentation session start indicator and end indicator and (2) a corresponding IP address and/or a MAC address of the media device 135 from the MMI obtained from the content publisher 110. The example data validator 320 may calculate a first media presentation session duration by calculating a difference between the first start indicator and the first end indicator. The example data validator 320 may obtain a second media presentation session start indicator and end indicator from the media device 135 (e.g., the media device 135 transmits the second start and end indicators to the audit database 165 by executing an automated monitoring script) via the audit database 165. The example data validator 320 may calculate a second media presentation session duration by calculating a difference between the second start indicator and the second end indicator.

The data validator 320 may compare (1) the first media presentation session duration based on MMI obtained from the example content publisher 110 to (2) the second media presentation session duration based on information obtained from the media device 135. The example data validator 320 may determine whether there are any differences based on the comparison.

In response to determining a difference, the example data validator 320 may determine that the MMI obtained from the example content publisher 110 is not to be used for reporting. For example, the data validator 320 may generate and transmit a validation alert to the validation database 170, where the validation alert includes an indicator that the MMI obtained from the example content publisher 110 has not been validated. In response to the first and the second media presentation session durations matching, the example data validator 320 may determine that the MMI obtained from the example content publisher 110 is to be used for reporting. For example, the data validator 320 may generate and transmit a validation alert to the validation database 170, where the validation alert includes an indicator that the MMI obtained from the example content publisher 110 has been validated.

In some instances, the data validator 320 performs quality control validation of MMI by comparing the MMI to audience measurement data. For example, the data validator 320 may query the metering database 160 to transmit metering data and/or query the audit database 165 to transmit audit data to the data validator 320. The example data validator 320 may query for audience measurement data of interest (e.g., metering data corresponding to the same media presented at the media devices 135, 140, 145). The example data validator 320 may query for audience measurement data of interest based on one or more demographics of interest, a geographical area of interest, a device platform (e.g., a smartphone manufacturer, a tablet manufacturer model identifier, etc.), an asset id (e.g., a television show, a movie, a video game, etc.), etc.

In some examples, the data validator 320 compares (1) the MMI corresponding to a media segment to (2) the audience measurement data corresponding to the media segment. The example data validator 320 may determine whether there are any differences between the MMI and the audience measurement data. For example, if there is audience measurement data that is not included in the MMI, then the data validator 320 may determine that the content publisher 110 is underreporting MMI corresponding to media presentation at the media devices 135, 140, 145. In another example, if there is MMI that is not included in the audience measurement data, then the data validator 320 may determine that the content publisher 110 is overreporting MMI corresponding to the media devices 135, 140, 145. In response to determining a difference, the example data validator 320 may determine that the MMI obtained from example content publisher 110 is not to be used for reporting. For example, the data validator 320 may generate and transmit a validation alert to the validation database 170.

Additionally or alternatively, the example data validator 320 may perform quality control validation of MMI obtained from the example content publisher 110 by obtaining information from a media device executing an automated monitoring script. For example, the AME may instruct a panelist to configure a media device associated with the panelist to execute an automated monitoring script. The media device may execute the automated monitoring script periodically (e.g., based on a timer) or on command (e.g., executed manually by a user, based on a query from the AME, based on a query from the example data validator 320, etc.) to transmit viewing behavior (e.g., media identifiers, key logs, screen captures, etc.) to the example data validator 320. The example data validator 320 may compare MMI obtained from the content publisher 110 to the viewing behavior from the media device. In response to determining a difference between the MMI and the viewing behavior, the example data validator 320 may determine that the MMI obtained from example content publisher 110 is not to be used for reporting. For example, the data validator 320 may generate and transmit a validation alert to the validation database 170.

In some examples, the data validator 320 performs quality control validation of MMI obtained from the content publisher 110 by obtaining media identifiers (e.g., codes, signatures, watermarks, etc.) extracted by a device at a reference site (e.g., a location that determines baseline information to which subsequent information may be compared to). For example, a device at a reference site may extract media identifiers from media. The example data validator 320 may obtain the media identifiers for the media from the device at the reference site. The example data validator 320 may compare the media identifiers obtained from the device at the reference site to media identifiers based on the media obtained from the example content publisher 110. In response to determining a difference between the media identifiers, the example data validator 320 may determine that the MMI obtained from example content publisher 110 is not to be used for reporting.

In the illustrated example of FIG. 3, the AME media creditor 120 includes the report generator 330 to generate and/or prepare reports. The example report generator 330 prepares media measurement reports indicative of presentation of media at a media device. For example, the report generator 330 may generate a report including MMI based on mapping (1) a publisher asset identifier to (2) an AME identifier and/or an AME timestamp. In some examples, the report generator 330 generates a report based on an output of one or more quality control validation operations. For example, the report generator 330 may generate a report indicating that MMI obtained from the content publisher 110 is not to be used for reporting. In some instances, the report generator 330 transmits the reports to the validation database 170, an audience measurement entity central server, an operation analyzer, a reporting server, etc.

While an example manner of implementing the AME media creditor 120 of FIG. 1 is illustrated in FIG. 3, one or more of the elements, processes and/or devices illustrated in FIG. 3 may be combined, divided, re-arranged, omitted, eliminated, and/or implemented in any other way. Further, the example network interface 300, the example media identifier 310, the example data validator 320, the example report generator 330 and/or, more generally, the example AME media creditor 120 of FIG. 3 may be implemented by hardware, software, firmware, and/or any combination of hardware, software, and/or firmware. Thus, for example, any of the example network interface 300, the example media identifier 310, the example data validator 320, the example report generator 330 and/or, more generally, the example AME media creditor 120 of FIG. 3 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example network interface 300, the example media identifier 310, the example data validator 320, the example report generator 330 and/or, more generally, the example AME media creditor 120 of FIG. 3 is/are hereby expressly defined to include a non-transitory computer readable storage device or storage disk such as a memory, a digital versatile disk (DVD), a compact disk (CD), a Blu-ray disk, etc. storing the software and/or firmware. Further still, the example AME media creditor 120 of FIG. 3 may include one or more elements, processes, and/or devices in addition to, or instead of, those illustrated in FIG. 3, and/or may include more than one of any or all of the illustrated elements, processes, and devices.

Figure 4:
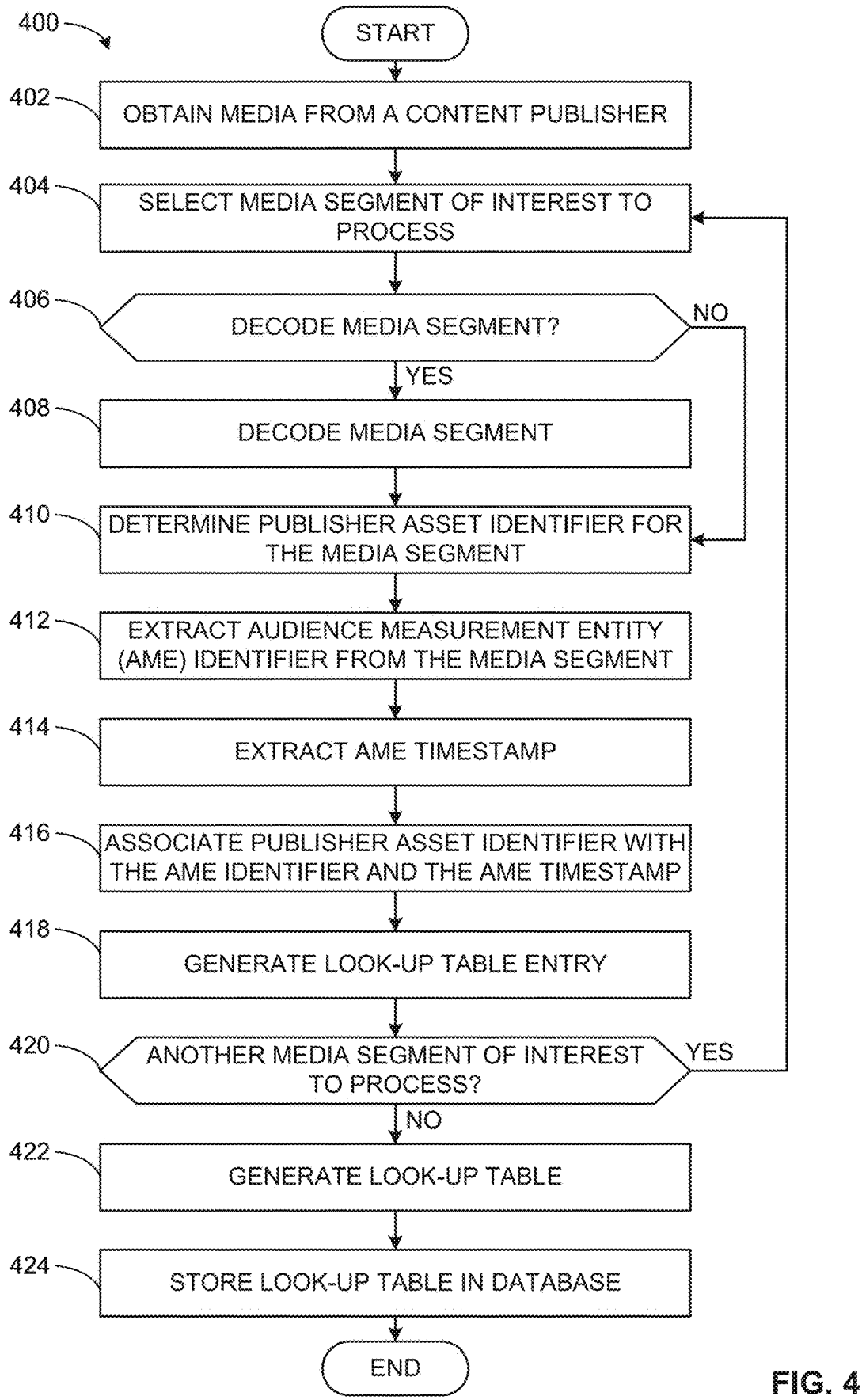
FIG. 4 is a flowchart representative of an example method that may be used to implement the example AME media analyzer of FIGS. 1 and/or 2.

A flowchart representative of example machine readable instructions for implementing the example AME media analyzer 115 of FIGS. 1 and/or 2 is shown in FIG. 4. In this example, the machine readable instructions comprise a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4, many other methods of implementing the example AME media analyzer 115 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example method of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 7:
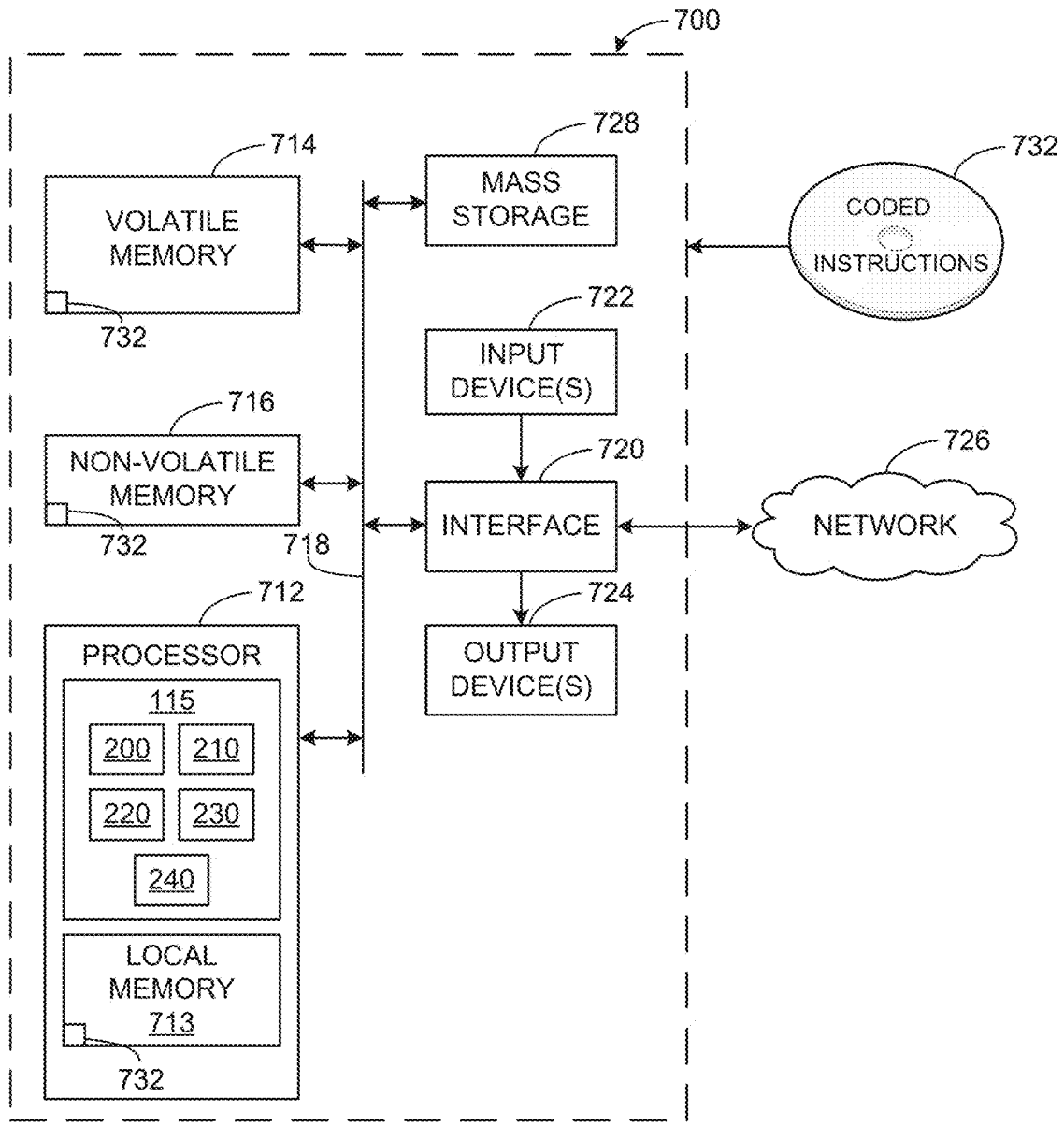
FIG. 7 is a block diagram of an example processing platform structured to execute the example machine readable instructions of FIG. 4 to implement the AME media analyzer of FIGS. 1 and/or 2.

FIG. 4 is a flowchart representative of example machine readable instructions which may be executed by the processor 712 of FIG. 7 to implement the example AME media analyzer 115 of FIGS. 1 and/or 2 to analyze and process media. The example program 400 of FIG. 4 begins at block 402 when the example AME media analyzer 115 obtains media from a content publisher. For example, the communication receiver 200 may obtain a media feed from the media splitter 125. At block 404, the example AME media analyzer 115 selects a media segment of interest to process. For example, the decoder 210 may select a portion or a segment of the media feed to process.

At block 406, the example AME media analyzer 115 determines whether to decode the media segment. For example, the decoder 210 may determine that there is embedded metadata in the media segment. If, at block 406, the example AME media analyzer 115 determines not to decode the media segment, control proceeds to block 410 to determine a publisher asset identifier for the media segment. If, at block 406, the example AME media analyzer 115 determines to decode the media segment, then, at block 408, the AME media analyzer 115 decodes the media segment. For example, the decoder 210 may decode a code, a watermark, etc. from the media segment.

At block 410, the example AME media analyzer 115 determines a publisher asset identifier for the media segment. For example, the data extractor 220 may determine a publisher asset identifier identifying the content publisher 110 as providing the media feed, identifying the media segment, etc. At block 412, the example AME media analyzer 115 extracts an AME identifier from the media segment. For example, the data extractor 220 may extract the code, the watermark, etc. from the media feed. In another example, the decoder 210 may extract a signature from the media segment. At block 414, the example AME media analyzer 115 extracts an AME timestamp. For example, the data extractor 220 may extract a timestamp corresponding to a time location in the media segment where the code, the signature, the watermark, etc. was extracted.

At block 416, the example AME media analyzer 115 associates the publisher asset identifier with the AME identifier and the AME timestamp. For example, the associator 230 may associate or credit the publisher asset identifier with the AME identifier and the AME timestamp. At block 418, the example AME media analyzer 115 generates a look-up table entry. For example, the associator 230 may generate a look-up table based on the association or crediting of the publisher asset identifier with the AME identifier and the AME timestamp.

At block 420, the example AME media analyzer 115 determines whether there is another media segment of interest to process. For example, the decoder 210 may determine whether the media feed has ended, whether there is another media segment left to process, etc. If, at block 420, the example AME media analyzer 115 determines that there is another media segment of interest to process, control returns to block 404 to select another media segment of interest to process. If, at block 420, the example AME media analyzer 115 determines that there is not another media segment of interest to process, then, at block 422, the AME media analyzer 115 generates a look-up table. For example, the associator 230 may generate a look-up table based on one or more look-up table entries. At block 424, the example AME media analyzer 115 stores the look-up table in a database. For example, the communication transmitter 240 may transmit the look-up table to the media association database 155.

Figure 5:
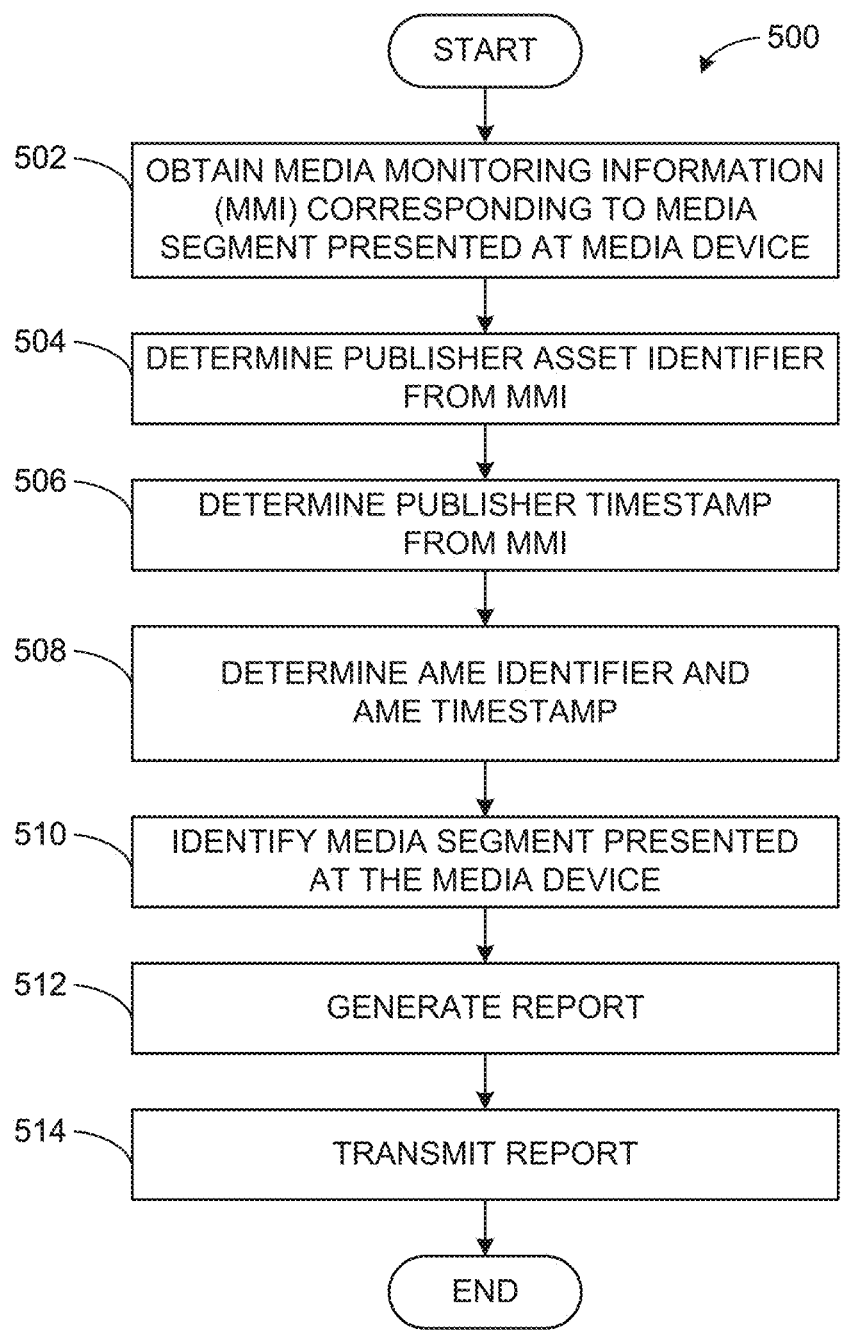
FIG. 5 is a flowchart representative of an example method that may be used to implement the example AME media creditor of FIGS. 1 and/or 3.
Figure 6:
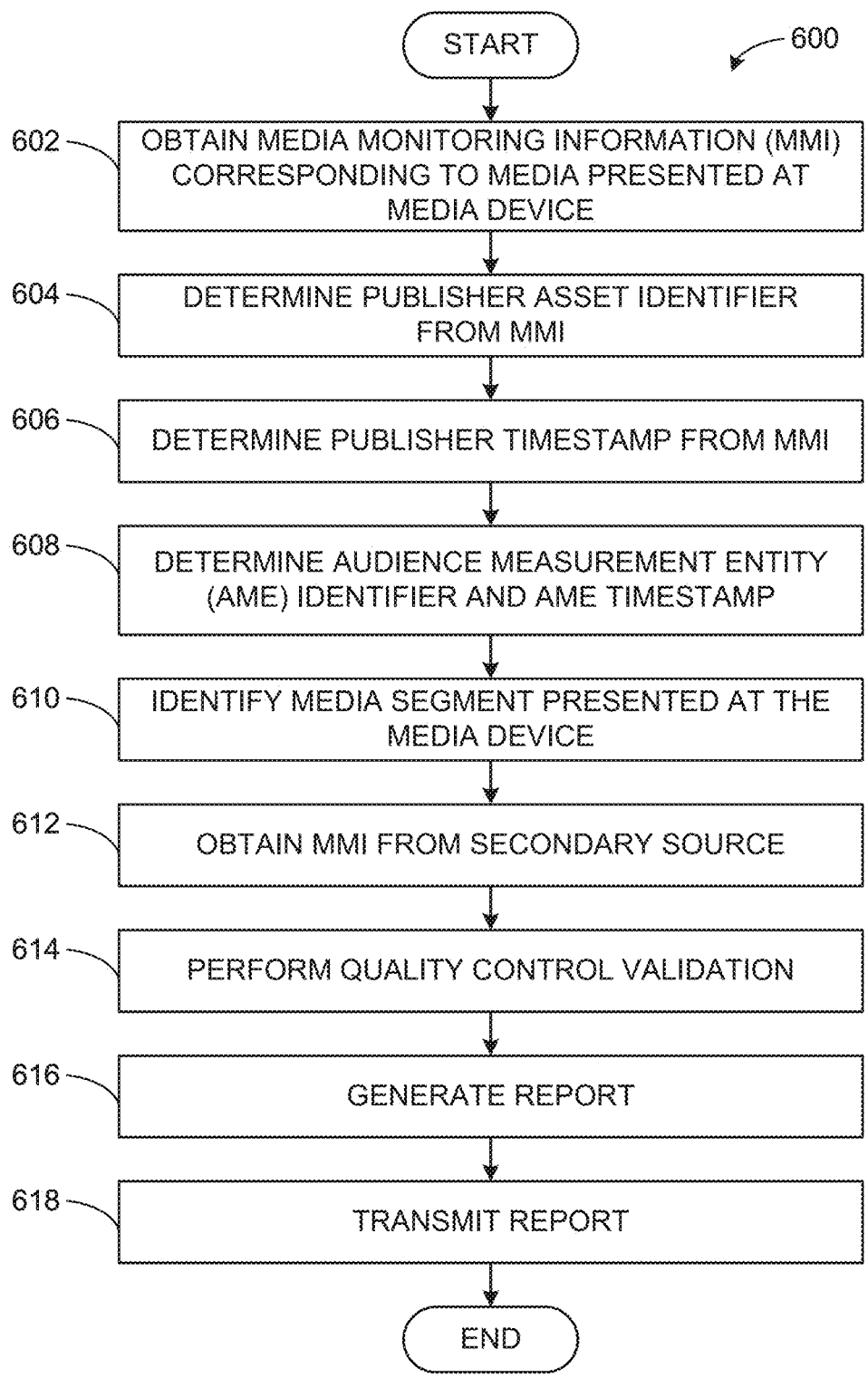
FIG. 6 is a flowchart representative of an example method that may be used to implement the example AME media creditor of FIGS. 1 and/or 3.

Flowcharts representative of example machine readable instructions for implementing the example AME media creditor 120 of FIGS. 1 and/or 3 are shown in FIGS. 5-6. In these examples, the machine readable instructions comprise a program for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5-6, many other methods of implementing the example AME media creditor 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example methods of FIGS. 5-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). Additionally or alternatively, the example methods of FIGS. 5-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

Figure 8:
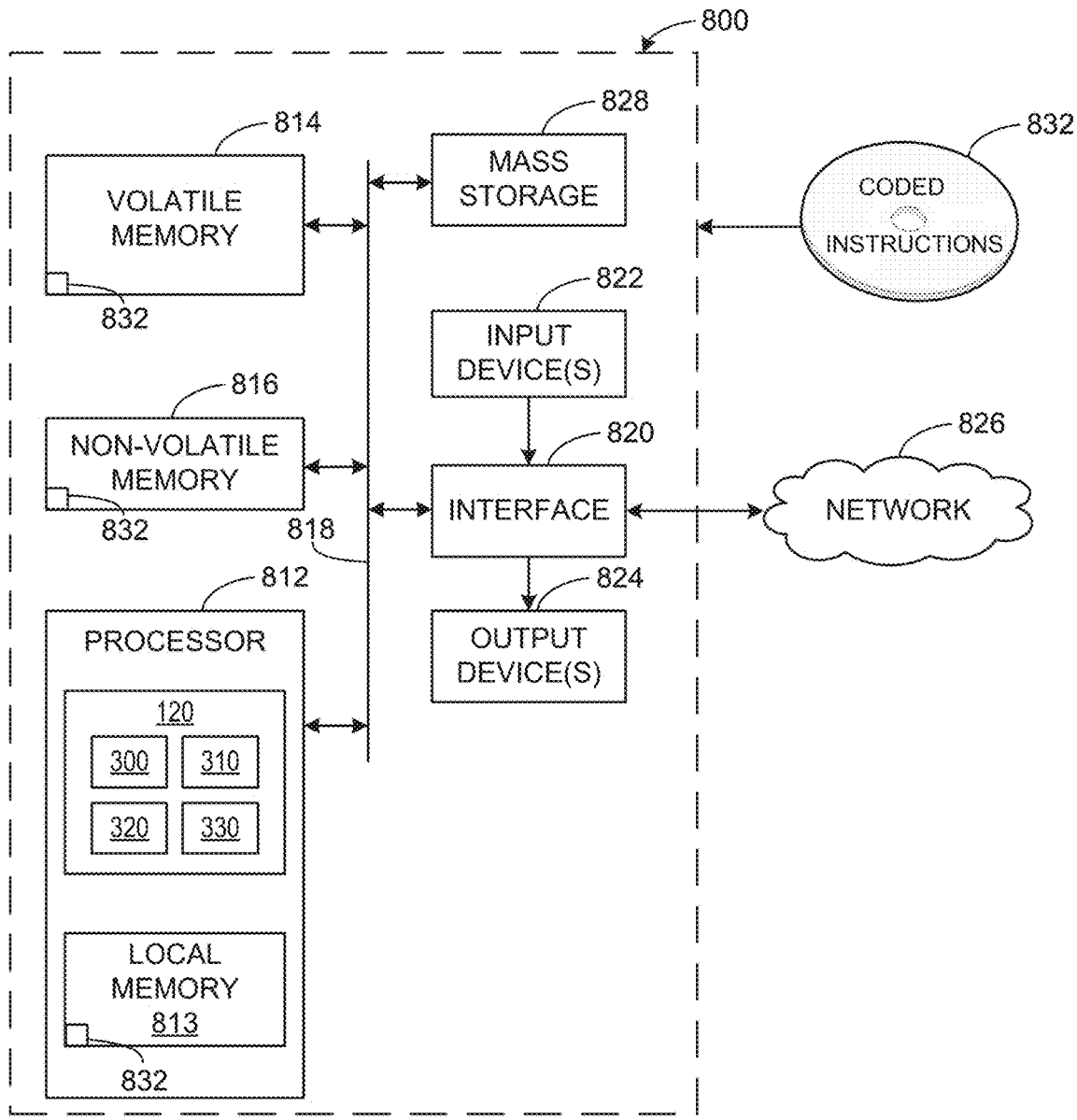
FIG. 8 is a block diagram of an example processing platform structured to execute the example machine readable instructions of FIGS. 5-6 to implement the AME media creditor of FIGS. 1 and/or 3.

FIG. 5 is a flowchart representative of example machine readable instructions which may be executed by the processor 812 of FIG. 8 to implement the example AME media creditor 120 of FIGS. 1 and/or 3 to credit media. The example program 500 of FIG. 5 begins at block 502 when the example AME media creditor 120 obtains media monitoring information (MMI) corresponding to a media segment presented at a media device. For example, the network interface 300 may obtain MMI from the content publisher 110 via the communication processor 130 corresponding to a media segment presented at the media devices 135, 140, 145.

At block 504, the example AME media creditor 120 determines a publisher asset identifier from the MMI. For example, the media identifier 310 may determine a publisher asset identifier corresponding to the media segment presented at the media devices 135, 140, 145. At block 506, the example AME media creditor 120 determines a publisher timestamp from the MMI. For example, the media identifier 310 may determine a timestamp corresponding to the media segment as determined by the content publisher 110. At block 508, the example AME media creditor 120 determines an AME identifier and an AME timestamp. For example, the media identifier 310 may map the publisher asset identifier and the publisher timestamp to an AME identifier and an AME timestamp in a look-up table stored in the media association database 155.

At block 510, the example AME media creditor 120 identifies the media segment presented at the media device. For example, the media identifier 310 may identify the media segment presented at the media devices 135, 140, 145 based on the determining the AME identifier and the AME timestamp. At block 512, the example AME media creditor 120 generates a report. For example, the report generator 330 may generate a report including crediting the identified media as being presented at the media devices 135, 140, 145. At block 514, the example AME media creditor 120 transmits the report. For example, the report generator 330 may transmit the report to an AME central server, the validation database 170, etc.

FIG. 6 is a flowchart representative of example machine readable instructions which may be executed by the processor 812 of FIG. 8 to implement the example AME media creditor 120 of FIGS. 1 and/or 3 to audit and/or validate MMI. The example program 600 of FIG. 6 begins at block 602 when the example AME media creditor 120 obtains MMI (MMI) corresponding to media presented at a media device. For example, the network interface 300 may obtain MMI corresponding to a media segment presented at the media devices 135, 140, 145.

At block 604, the example AME media creditor 120 determines a publisher asset identifier from the MMI. For example, the media identifier 310 may determine a publisher asset identifier for the media segment. At block 606, the example AME media creditor 120 determines a publisher timestamp from the MMI. For example, the media identifier 310 may determine a timestamp corresponding to the media segment as determined by the content publisher 110. At block 608, the example AME media creditor 120 determines an AME identifier and an AME timestamp. For example, the media identifier 310 may map the publisher asset identifier and the publisher timestamp to an AME identifier and an AME timestamp in a look-up table stored in the media association database 155.

At block 610, the example AME media creditor 120 identifies the media segment presented at the media device. For example, the media identifier 310 may identify the media segment presented at the media devices 135, 140, 145 based on determining the AME identifier and the AME timestamp. At block 612, the example AME media creditor 120 obtains MMI from a secondary source. For example, the data validator 320 may obtain audience measurement data such as metering data from the metering database 160, audit data from the audit database 165, etc.

At block 614, the example AME media creditor 120 performs a quality control validation. For example, the data validator 320 may validate the MMI obtained from the content publisher 110 by comparing (1) a first media presentation session duration based on the MMI obtained from the content publisher 110, and (2) a second media presentation session duration based on the MMI obtained from the audit database 165. In another example, the data validator 320 may validate the MMI obtained from the content publisher 110 by comparing (1) a first media identifier based on the MMI obtained from the content publisher 110, and (2) a second media identifier based on the panelist data, audit data, census data, etc. obtained from the metering database 160, the audit database 165, etc.

At block 616, the example AME media creditor 120 generates a report. For example, the report generator 330 may generate a report including a validation of the MMI obtained from the content publisher 110, a crediting of media to a media device, a mapping of a publisher asset identifier and/or a publisher timestamp to an AME identifier and/or an AME timestamp, etc. At block 618, the example AME media creditor 120 transmits the report. For example, the report generator 330 may transmit the report to an AME central server, the validation database 170, etc.

FIG. 7 is a block diagram of an example processor platform 700 capable of executing instructions to implement the method of FIG. 4 and the example AME media analyzer 115 of FIGS. 1 and/or 2. The processor platform 700 can be, for example, a server, an industrial computer, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The hardware processor may be a semiconductor based (e.g., silicon based) device. In this example, the processor 712 implements the example communication receiver 200, the example decoder 210, the example data extractor 220, the example associator 230, the example communication transmitter 240 and/or, more generally, the example AME media analyzer 115 of FIGS. 1 and/or 2.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip, or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, magnetic media, compact disk drives, Blu-ray disk drives, RAID systems, and digital versatile disk (DVD) drives. The example mass storage 728 may implement the example media association database 155.

The coded instructions 732 of FIG. 4 may be stored in the mass storage device 728, in the volatile memory 714, in the non-volatile memory 716, and/or on a removable non-transitory computer readable storage medium such as a CD or DVD.

FIG. 8 is a block diagram of an example processor platform 800 capable of executing instructions to implement the methods of FIGS. 5-6 and the example AME media creditor 120 of FIGS. 1 and/or 3. The processor platform 800 can be, for example, a server, an industrial computer, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor 812 implements the example network interface 300, the example media identifier 310, the example data validator 320, the example report generator 330 and/or, more generally, the example AME media creditor 120 of FIGS. 1 and/or 3.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip, or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.). The interface circuit 820 may implement the example communication receiver of FIG. 2 and/or the example network interface 300 of FIG. 3.

The processor platform 800 of the illustrated example also includes one or more mass storage devices 828 for storing software and/or data. Examples of such mass storage devices 828 include floppy disk drives, hard drive disks, magnetic media, compact disk drives, Blu-ray disk drives, RAID systems, and digital versatile disk (DVD) drives. The example mass storage 828 may implement the example media association database 155.

The coded instructions 832 of FIGS. 5-6 may be stored in the mass storage device 828, in the volatile memory 814, in the non-volatile memory 816, and/or on a removable non-transitory computer-readable storage medium such as a CD or DVD.

From the foregoing, it will be appreciated that the above disclosed methods, apparatus, and articles of manufacture credit presentation of media to a media device based on obtaining media monitoring information including a publisher asset identifier. Crediting the media to the media device based on the publisher asset identifier reduces complexity of media monitoring implementation at a content publisher. By implementing a multi-server approach, an audience measurement entity can perform media crediting by more accurately identifying the presented media. Moreover, by implementing the multi-server approach, the audience measurement entity can achieve greater device coverage by monitoring media accessed via a diverse range of media device types. In addition, the audience measurement entity can upgrade media monitoring systems more quickly due to media monitoring being conducted external to individual media devices. By implementing a multi-server approach, the AME can improve memory and processor utilization (e.g., increase available memory storage and/or calculation resources) due to shifting processing tasks from the AME to the content publisher and/or the media device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to monitor media, the apparatus comprising:
   at least one memory;
   machine-readable instructions; and
   at least one processor to execute the machine-readable instructions to at least:
      generate a first database based on storage of a first data association of a first media identifier and a first timestamp to a second media identifier in the first database, the first media identifier and the first timestamp based on media obtained from a server, the first media identifier and the second media identifier to identify the media, the second media identifier from the server;
      generate a second database based on storage of a second data association of a third media identifier and a second timestamp in the second database, the third media identifier and the second timestamp based on media monitoring information obtained from the server, the media monitoring information obtained from the server after an access of the media by a media device, the third media identifier to identify the media accessed by the media device; and
      credit access of the media to the media device based on a mapping of the third media identifier and the second timestamp from the second database to the first media identifier and the first timestamp in the first database, the mapping based on a determination that the third media identifier corresponds to the second media identifier.

2. The apparatus of claim 1, wherein the mapping is a first mapping, and the at least one processor is to perform a second mapping of the first media identifier and the first timestamp to the second media identifier in a look-up table in the first database.

3. The apparatus of claim 1, wherein the at least one processor is to:
   detect metadata in a portion of the media; and
   decode the metadata to generate an output representative of the first media identifier;
   compare the first media identifier to the third media identifier; and
   identify the portion of the media based on the comparison.

4. The apparatus of claim 1, wherein the at least one processor is to determine that the first media identifier and the second media identifier are codes or watermarks.

5. The apparatus of claim 1, wherein the at least one processor is to:
   after a non-detection of metadata in a portion of the media, extract a first signature from the portion of the media;
   compare the first signature to a second signature; and
   identify the portion of the media based on the comparison.

6. The apparatus of claim 1, wherein the media monitoring information is first media monitoring information, and the at least one processor is to:
   cause retrieval of second media monitoring information from a third database based on at least one of metering data, audit data, or census data;

perform a comparison of the first media monitoring information to the second media monitoring information; and generate an alert to not report the first media monitoring information after a determination that at least a first portion of the first media monitoring information does not match at least a second portion of the second media monitoring information.

7. The apparatus of claim 6, wherein the at least one processor is to:

execute a comparison of a first media presentation session duration and a second media presentation session duration, the first media presentation session duration based on the first media monitoring information, the second media presentation session duration based on the second media monitoring information; and generate an alert to not report the first media monitoring information after a determination that the first media presentation session duration does not match the second media presentation session duration.

8. At least one non-transitory computer readable storage medium comprising instructions that, when executed, cause at least one processor to at least:

generate a first database based on storage of a first data association of a first media identifier and a first timestamp to a second media identifier in the first database, the first media identifier and the first timestamp based on media obtained from a server, the first media identifier and the second media identifier to identify the media, the second media identifier from the server;

generate a second database based on storage of a second data association of a third media identifier and a second timestamp in the second database, the third media identifier and the second timestamp based on media monitoring information obtained from the server, the media monitoring information obtained from the server after an access of the media by a media device, the third media identifier to identify the media accessed by the media device; and credit access of the media to the media device based on a mapping of the third media identifier and the second timestamp from the second database to the first media identifier and the first timestamp in the first database, the mapping based on a determination that the third media identifier corresponds to the second media identifier.

9. The at least one non-transitory computer readable storage medium of claim 8, wherein the mapping is a first mapping, and the instructions are to cause the at least one processor to perform a second mapping of the first media identifier and the first timestamp to the second media identifier in a look-up table in the first database.

10. The at least one non-transitory computer readable storage medium of claim 8, wherein the instructions are to cause the at least one processor to:

detect metadata in a portion of the media; and decode the metadata to generate an output representative of the first media identifier;

compare the first media identifier to the third media identifier; and identify the portion of the media based on the comparison.

11. The at least one non-transitory computer readable storage medium of claim 8, wherein the instructions are to cause the at least one processor to determine that the first media identifier and the second media identifier are codes or watermarks.

12. The at least one non-transitory computer readable storage medium of claim 8, wherein the instructions are to cause the at least one processor to:

after a non-detection of metadata in a portion of the media, extract a first signature from the portion of the media;

compare the first signature to a second signature; and identify the portion of the media based on the comparison.

13. The at least one non-transitory computer readable storage medium of claim 8, wherein the media monitoring information is first media monitoring information, and the instructions are to cause the at least one processor to:

cause retrieval of second media monitoring information from a third database based on at least one of metering data, audit data, or census data;

output a comparison of the first media monitoring information to the second media monitoring information; and cause display of an alert to not report the first media monitoring information after a determination that at least a first portion of the first media monitoring information does not match at least a second portion of the second media monitoring information.

14. The at least one non-transitory computer readable storage medium of claim 13, wherein the instructions are to cause the at least one processor to:

execute a comparison of a first media presentation session duration and a second media presentation session duration, the first media presentation session duration based on the first media monitoring information, the second media presentation session duration based on the second media monitoring information; and cause transmission of an alert to an electronic system to not report the first media monitoring information after a determination that the first media presentation session duration does not match the second media presentation session duration.

15. A method to monitor media, the method comprising:

generating a first database based on storage of a first data association of a first media identifier and a first timestamp to a second media identifier in the first database, the first media identifier and the first timestamp based on media obtained from a server, the first media identifier and the second media identifier to identify the media, the second media identifier from the server;

generating a second database based on storage of a second data association of a third media identifier and a second timestamp in the second database, the third media identifier and the second timestamp based on media monitoring information obtained from the server, the media monitoring information obtained from the server after an access of the media by a media device, the third media identifier to identify the media accessed by the media device; and crediting access of the media to the media device based on a mapping of the third media identifier and the second timestamp from the second database to the first media identifier and the first timestamp in the first database, the mapping based on a determination that the third media identifier corresponds to the second media identifier.

16. The method of claim 15, wherein the mapping is a first mapping, and the method further including performing a second mapping of the first media identifier and the first timestamp to the second media identifier in a look-up table in the first database.

17. The method of claim 15, wherein the server is associated with a content publisher and the second media identifier is a publisher asset identifier that identifies the content publisher.

18. The method of claim 15, further including:
detecting metadata in a portion of the media; and
decoding the metadata to generate an output representative of the first media identifier;
comparing the first media identifier to the third media identifier; and
identifying the portion of the media based on the comparison.

19. The method of claim 15, further including:
after a non-detection of metadata in a portion of the media, extracting a first signature from the portion of the media;
comparing the first signature to a second signature; and
identifying the portion of the media based on the comparison.

20. The method of claim 15, wherein the media monitoring information is first media monitoring information, and the method further including:
obtaining second media monitoring information from a third database based on at least one of metering data, audit data, or census data;
comparing the first media monitoring information to the second media monitoring information; and
generating an alert to not report the first media monitoring information after a determination that at least a first portion of the first media monitoring information does not match at least a second portion of the second media monitoring information.

21. The method of claim 20, further including:
comparing a first media presentation session duration and a second media presentation session duration, the first media presentation session duration based on the first media monitoring information, the second media presentation session duration based on the second media monitoring information; and
generating an alert to not report the first media monitoring information after a determination that the first media presentation session duration does not match the second media presentation session duration.

\* \* \* \* \*